United States Patent
Barker et al.

[15] 3,666,768
[45] May 30, 1972

[54] PHOSPHARYLATED 1,2,5-THIADIAZOLES

[72] Inventors: Michael D. Barker, Maidstone, Kent, England; Peter Kirby, Modesto, Calif.

[73] Assignee: Shell Oil Company, New York, N.Y.

[22] Filed: Apr. 12, 1968

[21] Appl. No.: 721,088

[30] Foreign Application Priority Data

Apr. 14, 1967    Great Britain......................17,199/67

[52] U.S. Cl..........................260/302 E, 260/302 D, 424/200
[51] Int. Cl. ................................................C07d 91/68
[58] Field of Search...............................................260/302 E

[56] References Cited

UNITED STATES PATENTS

| | | |
|---|---|---|
| 3,072,609 | 1/1963 | McConnell et al. ....................260/302 |
| 3,299,061 | 1/1967 | Schroeder..............................260/302 |

FOREIGN PATENTS OR APPLICATIONS

| | | |
|---|---|---|
| 652,050 | 12/1964 | Belgium................................260/302 |
| 713,278 | 8/1954 | Great Britain........................260/302 |

*Primary Examiner*—Alex Mazel
*Assistant Examiner*—R. J. Gallagher
*Attorney*—Frank R. La Fontaine

[57] ABSTRACT

This invention relates to novel dialkyl 3-(1,2,5-thiadiazolyl) phosphates and thionophosphates.

9 Claims, No Drawings

PHOSPHARYLATED 1,2,5-THIADIAZOLES

BACKGROUND OF THE INVENTION

1. Field of the Invention

This invention relates to novel phosphorylated 1,2,5-thiadiazoles, having a high level of insecticidal activity.

2. Description of the Prior Art

Belgium Pat. No. 652,050 describes certain phosphorylated 1,2,4-thiadiazoles as having insecticidal activity. These 1,2,4-thiadiazoles are structurally and chemically distinct from the phosphorylated 1,2,5-thiadiazoles of this invention.

SUMMARY OF THE INVENTION

It has now been found that certain novel phosphorylated 1,2,5-thiadiazoles have insecticidal activity.

This invention accordingly is the new class of phosphorylated 1,2,5-thiadiazoles, their use as insecticides and insecticidal formulations containing them.

DESCRIPTION OF THE PREFERRED EMBODIMENTS

The novel compounds of this invention can be described by the general formula

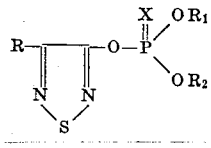

(I)

wherein X is oxygen or sulfur; R is hydrogen, halogen, cyano, alkoxycarbonyl carbamoyl, N-alkyl or N,N-dialkylcarbamoyl, or a hydrocarbon group which is an alkyl, cycloalkyl, aryl, alkaryl or aralkyl or such a hydrocarbon group substituted by from one to a plurality of halogen or cyano substituents; and $R_1$ and $R_2$, which may be the same or different, are alkyl.

Any halogen substituents, i.e., fluorine, chlorine, bromine or iodine, present are preferably middle halogen, i.e., chlorine or bromine.

The alkoxycarbonyl groups suitably contain 2-7, preferably 2-5, carbon atoms, and include methoxycarbonyl, ethoxycarbonyl, isoproxycarbonyl, propoxycarbonyl, butoxycarbonyl, pentyloxycarbonyl, hexloxycarbonyl and the like.

Each alkyl group in the N-alkyl or N,N-dialkylcarbamoyl

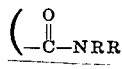

where each R is hydrogen or alkyl of one to six carbon atoms) group suitably has from one to six, preferably one to four, carbon atoms, and include methyl, ethyl, propyl, isopropyl, isobutyl, pentyl, hexyl and the like.

When R is alkyl, it is suitably of one to six, preferably one to four, carbon atoms, and includes methyl, ethyl, propyl, isobutyl, pentyl, hexyl and the like.

When R is cycloalkyl, it suitably has from three to eight carbon atoms in the ring with three to six preferred and includes cyclopropyl, cyclobutyl, cyclohexyl, cyclooctyl and the like.

When R is aryl, it is suitably of six to 10, preferably six, carbon atoms.

Suitable aralkyl and alkaryl radicals are those having seven to 18, preferably seven to 10 carbon atoms.

Examples of suitable aryl, aralkyl and alkaryl radicals are phenyl, naphthyl, benzyl, phenethyl, phenylisopropyl, 4-tolyl, 2,4,6-trimethylphenyl and the like.

It is understood that any of the alkyl moieties or R, $R_1$ or $R_2$ may be branched or straight-chain.

When the hydrocarbon groups are substituted by halogen or cyano, the number of these substituents is suitably up to three, preferably one.

The alkyl radicals represented by $R_1$ and $R_2$ suitably have from one to six, preferably one to four, carbon atoms, and include methyl, ethyl, propyl, isopropyl, butyl, isobutyl, pentyl, hexyl and the like.

Within the phosphorylated 1,2,5-thiadiazoles of formula I, it appears that the species having the highest insecticidal activity are those of the subclass where X is oxygen or sulfur, R is hydrogen and $R_1$ and $R_2$ are each alkyl of one to four carbon atoms. This subclass thus is preferred.

The preferred species within this subclass are:
dimethyl 1,2,5-thiadiazol-3-yl phosphorothionate
diethyl 1,2,5-thiadiazol-3-yl phosphorothionate
methyl isopropyl 1,2,5-thiadiazol-3-yl phosphorothionate
methyl butyl 1,2,5-thiadiazol-3-yl phosphorothionate
diethyl 1,2,5-thiadiazol-3-yl phosphorate.

The compounds of this invention are effective against a broad spectrum of insects. By the term insect is meant not only those members of the class Insecta, but also related or similar non-vertebrate animal organisms belonging to the allied classes of arthropods and including mites, ticks, spiders, wood lice and the like.

The compounds of this invention may be used in the form of pesticidal compositions. The pesticidal compositions contain the conventional inert carriers, i.e., the liquid or solid agents normally associated with pesticides. The pesticidal compositions may also include surface active agents.

The term "carrier" as used herein means a material, which may be inorganic or organic and of synthetic or natural origin, with which the active compound is mixed or formulated to facilitate its application to the plant, seed, soil or other object to be treated, or its storage, transport or handling. The carrier may be a solid or a fluid. Any of the material usually applied in formulating pesticides may be used as carrier.

Examples of suitable solid carrier are silicates, clays, for example, kaolinite clay, synthetic hydrated silicon oxides, synthetic calcium silicates, elements such as for example, carbon and sulfur, natural and synthetic resins such as for example, coumarone resins, rosin, copal, shellac, dammar, polyvinyl chloride and styrene polymers and copolymers, solid polychlorophenols, bitumen, asphaltite, waxes such as for example, beeswax, paraffin wax, montan wax and chlorinated mineral waxes, and solid fertilizers for example, superphosphates.

Examples of suitable fluid carriers are water, alcohols, such as for example, isopropanol, ketones such as for example, acetone, methyl ethyl ketone, methyl isobutyl ketone and cyclohexanone, ethers, aromatic hydrocarbons such as for example, benzene and toluene, petroleum fractions such as for example, kerosene, chlorinated hydrocarbons, such as for example, carbon tetrachloride, including liquefied normally vaporous gaseous compounds. Mixtures of different liquids are often suitable.

The surface-active agent may be a wetting agent, an emulsifying agent or a dispersing agent; it may be non-ionic or ionic. Any of the surface-active agents usually applied in formulating herbicides or insecticides may be used. Examples of suitable surface-active agents are the sodium or calcium salts of polyacrylic acids, the condensation products of fatty acids or aliphatic amines or amides containing at least 12 carbon atoms in the molecule with ethylene oxide and/or propylene oxide; partial esters of the above fatty acids with glycerol, sorbitan, sucrose or pentaerythritol; condensation products of alkyl phenols, for example P-octylphenol or p-octylcresol, with ethylene oxide and/or propylene oxide; sulfates or sulfonates of these condensation products; and alkali metal salts preferably sodium salts, or sulfuric acid esters or sulfonic acids containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate.

The compositions of the invention may be formulated as wettable powders, dusts, granules, solutions, emulsifiable concentrates, emulsions and pastes. Wettable powders are usually compounded to contain 25, 50 or 75 % of toxicant and usually contain, in addition to solid carrier, 3–10% of a dispersing agent and, where necessary, 0–10% of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½–10 % of toxicant. Granules are usually prepared to have a size between 10 and 100 BS mesh, and may be manufactured by agglomeration or impregnation techniques. Generally, granules will contain ½–25 % toxicant and 0–25% of additives such as stabilizers, slow releases modifiers, binding agents, etc. Emulsifiable concentrates usually contain, in addition to the solvent and, when necessary, co-solvent, 10–50% w/v toxicant, 2–20% w/v emulsifiers and 0–20% of appropriate additives such as stabilizers, penetrants and corrosion inhibitors. Pastes are compounded so as to obtain a stable, flowable product and usually contain 10–60% toxicant, 2–20% of appropriate additives and, as carrier, water or an organic liquid in which the toxicant is substantially insoluble.

The compositions of the invention may contain other ingredients, for example, protective colloids such as gelatin, glue, casein, gums and polyvinyl alcohol; sodium polyphosphates; cellulose ethers, stabilizers such as ethylene diamine tetra-acetic acid; other pesticides; and stickers, for example, non-volatile oils.

Aqueous dispersions and emulsions, for example, compositions obtained by diluting a wettable powder or an emulsifiable concentrate according to the invention with water, also lie within the scope of the present invention. The said emulsions may be of the water-in-oil or of the oil-in-water type, and may have a thick "mayonnaise"-like consistency.

The amount of the 1,2,5-thiadiazole necessary to control or kill the insects is defined as the pesticidal amount. This quantity will obviously vary with the species of 1,2,5-thiadiazole, the particular pest, type of formulation, environmental conditions, etc. Those versed in the insecticidal field, however, can readily determine the optimum amount for any particular situation.

The pesticidal composition will usually contain from about 0.001–95% by weight of the 1,2,5-thiadiazole, based upon the total weight of 1,2,5-thiadiazole and carrier.

The compounds of the invention have a favorable mammalian toxicity. Thus, when tested against mice the $LD_{50}$ (acute, oral) for the compounds dimethyl 1,2,5-thiadiazol-3-yl phosphorothionate and dimethyl 3-methoxycarbonyl-1,2,5-thiadiazol-4-yl phosphorothionate were found to be 200–400mgkg.

PREPARATION

The compounds of this invention may be prepared by a process which comprises reacting, preferably under basic conditions, a hydroxy-1,2,5-thiadiazole of the following general formula

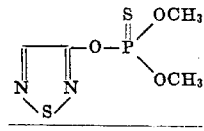

(II)

or an alkali metal salt thereof, with a halide of the following general formula

(III)

wherein R, $R_1$, 1, $R_2$ and X have the meanings aforesaid and hal represents a halogen atom. The basic conditions for the reaction may be produced where necessary by the addition of a base. When a base is added it may be a nitrogenous base, e.g. trimethylamine, or preferably an alkali or alkaline earth metal carbonate, e.g. sodium or potassium carbonate.

The reaction is preferably carried out in an inert liquid reaction medium, which may be a solvent for the reactants or for the products of the reaction, or both. Inert reaction media such as acetone and methyl isobutyl ketone are especially suitable for this purpose; other reaction media such as benzene, diethyl ether, and tetrahydrofuran may also be used.

The reaction may be carried out at a temperature in the range 0°–150° C., preferably between 50° and 100° C.

The hydroxy-1,2,5-thiadiazoles used as starting materials in the above process may be prepared according to the method of Ross and Smith (Journal of the American Chemical Society — 1964, pg. 2,861) or the method of Weinstock et al. (Tetrahedron Letters—1966, pg. 1263), or by modifications of these methods. When the group R in the hydroxy compound of formula II represents a N-alkyl or N, N-dialkylcarbamoyl group, it is conveniently prepared by hydrolysis of 3-hydroxy-4-cyano-1,2,5-thiadiazole, suitably by means of an alkali metal hydroxide, followed by halogenation, conveniently using thionyl chloride, and reaction of the resultant acyl halide with the appropriate alkyl or dialkylamine, preferably in ether solution.

The compounds of the invention, their preparation, their insecticidal activity and compositions containing them are further illustrated in the Examples which follow. In Examples I-V, which illustrate the preparation of certain compounds of this invention, the structure of the product was confirmed by NMR and IR analyses in addition to the elemental analyses for which results are given. All the elemental analyses are based on percent by weight.

EXAMPLE I

Preparation of Dimethyl 1,2,5-thiadiazol-3-yl phosphorothionate.

Dry powdered potassium carbonate (1.4g) and dimethyl phosphorochloridothionate (1.6 g) were added to a solution of 4-hydroxy-1,2,5-thiadiazole (1.0 g) in dry methyl isobutyl ketone (15 ml) and the mixture stirred at 90°–100° C for 2 hours. After cooling, the reaction mixture was filtered and the solvent was removed from the filtrate under reduced pressure. The residual oil obtained in this manner was purified on a silica gel column using petroleum ether (b.p. 40°–60° C) as eluent.

The required compound was obtained as a yellow oil.

| Analysis | C | H |  |
|---|---|---|---|
| $C_4H_7PN_2S_2O_3$ requires : | 21.3; | 3.1; | 13.7% |
| Found : | 21.4; | 3.1; | 13.7% |

EXAMPLE II

Preparation of Dimethyl 3-phenyl-1,2,5-thiadiazol-4-yl phosphorothionate.

3-Phenyl-4-hydroxy-1,2,5-thiadiazole (1.0 g) was reacted with an equivalent amount of potassium hydroxide dissolved in ethanol to give the corresponding potassium salt of the hydroxythiadiazole, which was then dried by evaporation of the ethanol followed by solution in benzene and re-evaporation. This dried potassium salt was then dissolved in methyl isobutyl ketone (20 ml), and dimethyl phosphorochloridothionate (900 mg) was added. The mixture was then stirred at 100° C for 4 hours, filtered, and solvent removed from the filtrate by evaporation. The product was then purified chromatographically on a silica gel column using benzene/petroleum ether as eluent to yield the required compound as a colorless oil.

| Analysis | C | H | N |
|---|---|---|---|
| $C_{10}H_{11}PN_2S_2O_3$ requires: | 39.8; | 3.6; | 9.3% |
| Found: | 40.6; | 3.8; | 9.1% | synthesized and their analytical data are set out in Table 1 below. The first compound was obtained as a solid, m.pt. 40°–41 C, but the remainder of the compounds were oils whose structure was deduced from the method of synthesis and confirmed by NMR and IR analyses.

In this Table 1, compounds are identified by reference to the substituents on the formula

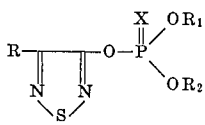

TABLE 1

| Compound | | | | | Analysis, percent | | | | | | | | | |
|---|---|---|---|---|---|---|---|---|---|---|---|---|---|---|
| | | | | | Required | | | | | Found | | | | |
| R | $R_1$ | $R_2$ | X | | C | Cl | H | N | P | C | Cl | H | N | P |
| $CH_3O\overset{O}{\overset{\|}{C}}-$ | $CH_3$ | $CH_3$ | S | $C_6H_9PN_2S_2O_5$ | 25.4 | | 3.2 | | 10.9 | 25.7 | | 2.9 | | 10.8 |
| $-CN$ | $CH_3$ | $CH_3$ | S | $C_5H_6PN_3S_2O_3$ | 23.9 | | 2.4 | 16.7 | 12.2 | 23.8 | | 2.7 | 16.2 | 12.1 |
| Cl | $CH_3$ | $CH_3$ | S | $C_4H_6PN_2S_2O_3Cl$ | 18.4 | 13.6 | 2.3 | 10.8 | 11.9 | 18.6 | 15.2 | 2.3 | 10.7 | 11.9 |
| $CH_3$ | $CH_3$ | $CH_3$ | S | $C_5H_9PN_2S_2O_3$ | 25.0 | | 3.7 | 11.7 | 12.9 | 27.4 | | 3.9 | 11.8 | 12.3 |
| H | $C_2H_5$ | $C_2H_5$ | S | $C_6H_{11}PN_2S_2O_3$ | 28.4 | | 4.3 | 11.0 | 12.2 | 29.2 | | 4.4 | 11.4 | 12.3 |
| H | $CH_3$ | $CH(CH_3)_2$ | S | $C_6H_{11}PN_2S_2O_3$ | 28.4 | | 4.3 | | 12.2 | 28.2 | | 4.3 | | 12.4 |
| H | $CH_3$ | $(CH_2)_3CH_3$ | S | $C_7H_{13}PN_2S_2O_3$ | 31.3 | | 4.9 | 10.4 | 11.5 | 32.2 | | 5.0 | 10.9 | 12.2 |
| $CH_3$ | $C_2H_5$ | $C_2H_5$ | O | $C_7H_{13}PN_2SO_4$ | 33.3 | | 5.2 | 11.1 | 12.3 | 32.6 | | 5.1 | 10.2 | 12.4 |

EXAMPLE III

Preparation of Diethyl 1,2,5-thiadiazol-3-yl phosphorate.

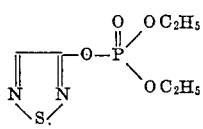

Following a similar procedure to that described in Example II, but replacing the dimethyl phosphorochloridothionate by diethyl phosphorochloridate, the desired product was obtained as a pale yellow oil.

| Analysis | C | H | P |
|---|---|---|---|
| $C_6H_{11}PN_2SO_4$ requires: | 30.2; | 4.6; | 13.0% |
| Found: | 30.2; | 4.8; | 13.2% |

EXAMPLE IV.

Preparation of Dimethyl 3-N,N-dimethycarbamoyl-1,2,5-thiadiazol-4-yl phosphorothionate.

3-hydroxy-4-cyano-1,2,5-thiadiazole (0.04 mole) was refluxed with water (50 ml) and potassium hydroxide (0.08 mole) for 4 hours, the reaction mixture acidified, extracted with ether, dried and evaporated. The resulting solid was then refluxed with thionyl chloride (34 ml); after which excess thionyl chloride was distilled off under reduced pressure. The residue was dissolved in dry ether and anhydrous dimethylamine (0.1 mole) dissolved in dry ether was added, the temperature being maintained between 5°–10° C. The ether layer was then evaporated and the residue chromatographed on a silica gel column using chloroform/methanol as eluent and sublimed to yield 3-hydroxy-4-N,N-dimethylcarbamoyl-1,2,5-thiadiazole.

This hydroxy-thiadiazole was then phosphorylated by a procedure similar to that described in Example II to yield the desired phosphorylated product as an oil.

| Analysis | C | H | N | P |
|---|---|---|---|---|
| $C_7H_{12}PN_3S_2O_4$ requires: | 28.3; | 4.1; | 14.1; | 10.4% |
| Found: | 29.1 | 4.1; | 14.7; | 9.3% |

EXAMPLE V

Following procedures analogous to those described in Examples I–IV, further phosphorylated 1,2,5-thiadiazoles were synthesized and their analytical data are set out in Table 1 below.

EXAMPLE VI

Preparation of a wettable powder composition.

A wettable powder having the composition shown below was prepared by blending, hammer milling and air milling the components.

| | |
|---|---|
| Dimethyl 3-methoxycarbonyl-1,2,5-thiadiazol-4-yl phosphorothionate. | 25% |
| Tamol 731 | 3% |
| Empicol LZ | 2% |
| Microcel 8E | 70% |

Where Tamol 731 (Registered Trade Mark) is a sodium polyacrylate; Empicol LZ (Registered Trade Mark) is sodium laurylsulfate; and Microcel 8E (Registered Trade Mark) is a synthetic calcium silicate.

EXAMPLE VII

Insecticidal activity of phosphorylated 1,2,5-thiadiazoles.

The insecticidal activity of the compounds obtained in the previous examples was tested as follows:

I. A 0.1% by weight solution in acetone of the compound to be tested was prepared, and taken up in a micrometer syringe. Two to 3-day old adult female house flies (Musca domestica) were anesthetized with carbon dioxide, and a 1 $\mu$l drop of the test solution was brushed off on the ventral abdomen of each, 20 flies being treated. The treated flies were held for 24 hours in glass jars, each containing a little granulated sugar as food for the flies, and the percentage of dead and moribund individuals was then recorded.

II. A quantity of 0.1 ml of a 0.1% by weight solution of the compound to be tested in acetone was mixed in a beaker with 100 ml of water. Twenty 5–6 day-old (4th instar) mosquito larvae (Aedes aegypti) were added and the beakers stored for 24 hours. The percentage of dead and moribund larvae was then recorded.

III. The compounds were formulated as solutions or suspensions in water containing 20% by weight of acetone and 0.05% by weight of Triton X 100 as wetting agent. The formulations contained 0.2% by weight of the compound to be tested. Turnip and broad bean plants, trimmed to one leaf each, were sprayed on the under surface of the leaf with the above formulation. Spraying was effected with a spraying machine delivering 40 gallons per acre, the plants passing under the spray on a moving belt. The 4th instar (8-day-old) diamond-back moth larvae (Plutella maculipennis), 10 apterous (6-day-old) vetch aphids (Megoura viciae), and 10 adult 1–2 week-old mustard beetles (Phaedon cochleariae)

respectively were placed on the sprayed leaves and each plant then enclosed in a glass cylinder fitted at one end with a muslin cap. Mortality counts were made after 24 hours.

IV. In tests against glass house red spider mites (*Tetranychus telarius*), leaf discs cut from French bean plants were sprayed in the manner described under III. 1 hour after spraying, the discs were inoculated with adult mites. Mortality counts were made 24 hours after inoculation.

V. In tests against large white butterfly larvae (*Pieris brassicae*), cabbage leaves were sprayed in the manner described under III. 10 3rd instar (8–10 day-old) larvae were placed on discs cut from the sprayed leaves within petri-dish pairs. Mortality counts were made 24 hours after inoculation.

The results of the above tests are summarized in Table 2 where A denotes 100% kill, B partial kill and C no kill of test insects. In Table 2 compounds are identified in the same manner as in Table 1.

wherein X is oxygen or sulfur; R is hydrogen, halogen, cyano, alkoxy carbonyl of from two to seven carbon atoms, carbamoyl, N-alkyl or N,N-dialkylcarbamoyl wherein each alkyl contains from one to six carbon atoms, a hydrocarbon group which is alkyl of one to six carbon atoms, cycloalkyl of three to eight carbon atoms in the ring, aryl of six to ten carbon atoms, aralkyl of seven to nine carbon atoms, or alkaryl of seven to nine carbon atoms or such hydrocarbon group substituted by from one to a plurality of halogen or cyano substituents; and $R_1$ and $R_2$, which may be in the same or different, are alkyl of one to six carbon atoms.

2. The compound of claim 1 wherein R is hydrogen and $R_1$ and $R_2$ which may be the same or different, are alkyl of 1-4 carbon atoms.

3. The compound of claim 2 wherein X is oxygen.

4. The compound of claim 3 wherein $R_1$ and $R_2$ are ethyl.

5. The compound of claim 2 wherein X is sulfur.

TABLE 2

| Compound | | | | Insecticidal activity | | | | | | |
|---|---|---|---|---|---|---|---|---|---|---|
| R | $R_1$ | $R_2$ | X | M.d. | A.a. | P.c. | P.m. | P.b. | M.v. | T.t. |
| H | $CH_3$ | $CH_3$ | S | A | A | A | A | A | A | A |
| H | $C_2H_5$ | $C_2H_5$ | S | A | A | A | A | A | A | A |
| H | $CH_3$ | $CH(CH_3)_2$ | S | A | A | A | A | A | A | A |
| H | $CH_3$ | $(CH_2)_3CH_3$ | S | A | A | A | A | A | A | A |
| CN | $CH_3$ | $CH_3$ | S | C | C | C | A | C | A | A |
| $CH_3OOC$ | $CH_3$ | $CH_3$ | S | B | C | A | A | C | A | A |
| $C_2H_5$ | $CH_3$ | $CH_3$ | S | B | A | B | C | | A | A |
| Cl | $CH_3$ | $CH_3$ | S | C | A | C | C | | B | A |
| $CH_3$ | $CH_3$ | $CH_3$ | S | A | A | A | A | | A | A |
| $(CH_3)_2N-CO-$ | $CH_3$ | $CH_3$ | S | A | A | A | B | | A | A |
| H | $C_2H_5$ | $C_2H_5$ | O | A | A | A | | A | A | A |
| $CH_3$ | $C_2H_5$ | $C_2H_5$ | O | A | A | A | A | | A | A |

We claim as our invention:

1. A compound of the formula

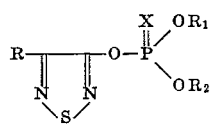

6. The compound of claim 5 wherein $R_1$ and $R_2$ are methyl.

7. The compound of claim 5 wherein $R_1$ and $R_2$ are ethyl.

8. The compound of claim 5 wherein $R_1$ is methyl and $R_2$ is isopropyl.

9. The compound of claim 5 wherein $R_1$ is methyl and $R_2$ is butyl.

* * * * *